United States Patent Office 2,846,436
Patented Aug. 5, 1958

2,846,436

PYRROLIDYLMETHYL AND PIPERIDYLMETHYL BICYCLOHEPTENES AND NORTRICYCLENES

Werner R. Boehme, Somerville, and Joseph Nichols, Princeton, N. J., assignors to Ethicon, Inc., a corporation of New Jersey No Drawing. Application March 26, 1956
Serial No. 573,587

6 Claims. (Cl. 260—293)

The present invention relates to new pharmaceutically effective pyrrolidylmethyl and piperidylmethyl bicycloheptenes and nortricyclenes and salts thereof which have especially advantageous utility as hypotensive and hypertensive agents and as sialogogues. The new substances of this invention are represented by the following planar structural formulae:

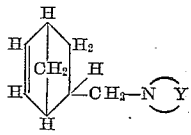

and

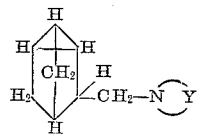

in which Y is a bivalent alkylene radical having four or five carbon atoms.

It is preferred that the substances of this invention be in the form of an acid addition salt, a quaternary ammonium salt or a quaternary ammonium hydroxide because of the increased solubility of such substances. Suitable salts include: acid addition salts such as hydrochloride, hydrobromide, hydroiodide, sulfate, phosphate and nitrate salts, and salts of aliphatic acids such as acetic acid, propionic acid, butyric acid and citric acid, as well as salts of dibasic acids having not more than six carbon atoms, such as succinic acid, malonic acid and adipic acid; and quaternary ammonium salts in which the cation is preferably an alkyl radical having not more than six carbon atoms or an aralkyl radical such as a benzyl radical, and in which the anion is preferably a halogen atom such as iodine, bromine or chlorine and a sulfate or para-toluene sulfonate radical. In the case of the quaternary ammonium hydroxides, the anion of the quaternary ammonium salts is replaced with a hydroxyl radical.

The following structural formula shows the spatial relationships of the exo and endo positions of substituent groups on a bicycloheptene nucleus.

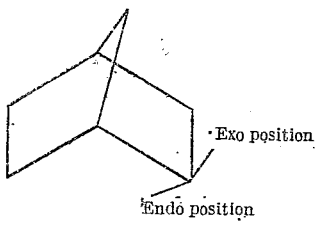

Endo-2-(1-pyrrolidylmethyl)-bicyclo-(2,2,1)-5-heptene, exo-2-(1-pyrrolidylmethyl)-bicyclo-(2,2,1)-5-heptene, endo-2-(1-piperidylmethyl)-bicyclo-(2,2,1)-5-heptene, and 3-(1-pyrrolidylmethyl)-nortricyclene and particularly, the qua- ternary methiodide salts of these compounds have outstanding utility as hypotensive agents. The quaternary benzyl chloride salt of endo-2-(1-pyrrolidylmethyl)-bicyclo-(2,2,1)-5-heptene has outstanding utility as a hypertensive agent.

The novel substances of this invention which contain the bicycloheptene ring may generally be prepared by the condensation of a suitable halomethylbicycloheptene with pyrrolidine or piperidine. They may also be prepared by the condensation of a suitable bicycloheptenecarbonylic acid halide with pyrrolidine or piperidine and a reduction of the carboxamide resulting from the condensation with lithium hydride.

The novel substances of this invention which contain the nortricyclene ring may generally be prepared by a condensation of nortricyclene-3-carboxylic acid halide with pyrrolidine or piperidine.

Bicyclo-(2,2,1)-5-heptene-2-endocarboxylic acid and its acid chloride were prepared according to the method of O. Diels and K. Alder, Annalien der Chemie, volume 460, page 98 (1928).

Bicyclo-(2,2,1)-5-heptene-2-exocarboxylic acid was prepared according to the method of C. D. Ver Nooy and C. S. Rondestvedt, Jr. Journal of the American Chemical Society, volume 77, page 3583 (1955).

2-endobromomethylbicyclo-(2,2,1)-5-heptene was prepared according to the method of K. Alder and E. Windemuth, U. S. Patent No. 2,352,606.

Nortricyclene-3-carboxylic acid was prepared according to the method of J. D. Roberts, E. R. Trumbull, Jr., W. Bennett and R. Armstrong, J. A. C. S., volume 72, page 3116 (1950).

The organic acid addition salts of the pyrrolidylmethyl and piperidylmethyl bicycloheptenes and nortricyclenes, which are tertiary amines, may be formed by passing the acid in gaseous form into an ether solution of the tertiary amines or by adding the tertiary amines or an alcohol solution of the tertiary amines to an alcohol solution of the inorganic acid. The salt of the tertiary amine is obtained by filtration or evaporation of the solution and recrystallization from a mixture of alcohol and ether. Organic acid salts of the tertiary amines are prepared by mixing an alcohol solution of the tertiary amines with an alcohol solution of the organic acid. The alcohol is evaporated, preferably under reduced pressure, and the salt is recrystallized from a mixture of alcohol and ether. Quaternary salts of the tertiary amines are prepared by adding an ester, such as an alkyl halide, benzyl halide, or methylparatoluenesulfate to an ethanol, ether or acetone solution of the tertiary amine. The solvent is removed by distillation and the salt is then recrystallized from a mixture of alcohol and ether. The hydroxide salt is prepared by shaking an aqueous solution of a quaternary ammonium salt with silver hydroxide. The precipitated silver salt which is formed is removed by filtration and the water is removed from the hydroxide salt of the amide by evaporation, preferably under reduced pressure.

Methods for the preparation of certain specific novel compounds of this invention are given in the examples which follow. It is of course to be understood that the following examples are intended for illustrative purposes only and are not to be construed as limiting the scope of the invention.

EXAMPLE I

*Endo-2-(1-pyrrolidylmethyl)-bicyclo-(2,2,1)-5-heptene*

32.3 grams of bicyclo-(2,2,1)-5-heptene - 2 - endocarbonyl chloride was dissolved in 75 grams of anhydrous benzene and added dropwise with stirring to an ice-cold solution of 29.8 grams of pyrrolidine in 100 grams of anhydrous benzene during one-half hour. The suspension was filtered and the filtrates were distilled under reduced pressure. N,N-tetramethylene-bicyclo-(2,2,1)-5-heptene-2-endocarboxamide distilled at 101–102° C. at 0.03 mm. pressure. The product was recrystallized from pentane and the recrystallized substance had a melting point of 57–57.5° C.

Calculated for $C_{12}H_{17}NO$: Percent
- Carbon _____ 75.35
- Hydrogen _____ 8.96
- Nitrogen _____ 7.32

Found:
- Carbon _____ 75.02
- Hydrogen _____ 9.04
- Nitrogen _____ 7.37

A solution of 64.7 grams of N,N-tetramethylene-bicyclo-(2,2,1)-5-heptene-2-endocarboxamide in 125 cc. of anhydrous ether was added to a suspension of 20 grams of lithium aluminum hydride in 400 cc. of anhydrous ether. The resulting complex was decomposed with fifty percent aqueous sodium hydroxide solution with cooling. The ether layer was decanted and dried over potassium hydroxide. Endo-2-(1-pyrrolidyl-methyl)-bicyclo-(2,2,1)-5-heptene was obtained by distillation of the dried ether solution at reduced pressure and distilled at 125–126° C. at 23 mm. pressure.

Calculated for $C_{12}H_{19}N$: Percent
- Carbon _____ 81.31
- Hydrogen _____ 10.80
- Nitrogen _____ 7.91

Found:
- Carbon _____ 81.33
- Hydrogen _____ 10.82
- Nitrogen _____ 7.28

The quarternary methiodide salt of endo-2-(1-pyrrolidylmethyl)-bicyclo-(2,2,1)-5-heptene was prepared by refluxing a solution of 10 grams of the amine and 9.7 grams of methyl iodide in 200 grams of anhydrous ethanol for one hour. The solvent was removed by distillation under reduced pressure and the solid residue was recrystallized from a mixture of ethanol and ethyl acetate. The recrystallized salt had a melting point of 214–214.5° C.

Calculated for $C_{13}H_{22}NI$: Percent
- Carbon _____ 48.91
- Hydrogen _____ 6.95
- Nitrogen _____ 4.39

Found:
- Carbon _____ 49.05
- Hydrogen _____ 6.91
- Nitrogen _____ 3.99

The quaternary benzyl chloride salt of endo-2-(1-pyrrolidylmethyl)-bicyclo-(2,2,1)-5-heptene was prepared by refluxing a solution of 17.7 grams of the amine and 14 grams of benzyl chloride in 150 grams of anhydrous ethanol for 1½ hours. The solvent was removed by distillation under reduced pressure and the residue was purified by recrystallization from acetone. The recrystallized salt had a melting point of 172–173° C.

Calculated for $C_{19}H_{26}NCl$: Percent
- Carbon _____ 75.10
- Hydrogen _____ 8.63
- Nitrogen _____ 4.61

Found:
- Carbon _____ 74.89
- Hydrogen _____ 8.82
- Nitrogen _____ 4.63

The hydrochloride salt of endo-2(1-pyrrolidylmethyl)-bicyclo-(2,2,1)-5-heptene was prepared by treating a solution of the amine in anhydrous ethanol with a slight excess of gaseous hydrogen chloride. The salt was precipitated by the addition of several volumes of ether and purified by reprecipitation of an ethanolic solution of the hydrochloride with ether. The purified salt had a melting point of 224–225° C.

Calculated for $C_{12}H_{20}NCl$: Percent
- Nitrogen _____ 6.55

Found:
- Nitrogen _____ 6.68

EXAMPLE II

*Exo-2-(1-pyrrolidylmethyl)-bicyclo-(2,2,1)-5-heptene*

138 grams of bicyclo-(2,2,1)-5-heptene-2-exocarboxylic acid in solution in 300 cc. chloroform was mixed with 131 grams of thionyl chloride. The solution was refluxed for three hours and the reaction mixture was distilled at reduced pressure. Bicyclo-(2,2,1)-5-heptene-2-exocarbonyl chloride distilled at 79–81° C. at 12 mm. pressure.

N,N-tetramethylenebicyclo-(2,2,1)-5-heptene-2-exocarboxamide was prepared from bicyclo-(2,2,1)-5-heptene-2-exocarbonyl chloride by the procedure described in Example I for the preparation of N,N-tetramethylenebicyclo-(2,2,1)-5-heptene-2-endocarboxamide. The exocarboxamide distilled at 101–103° C. at 0.02 mm. pressure.

Calculated for $C_{12}H_{17}NO$: Percent
- Carbon _____ 75.35
- Hydrogen _____ 8.96
- Nitrogen _____ 7.32

Found:
- Carbon _____ 75.19
- Hydrogen _____ 9.03
- Nitrogen _____ 7.36

Exo-2-(1-pyrrolidylmethyl)-bicyclo-(2,2,1)-5-heptene was obtained by reduction of N,N-tetramethylenebicyclo-(2,2,1)-5-heptene-2-exocarboxamide with lithium aluminum hydride by the procedure described in Example I for the reduction of N,N-tetramethylenebicyclo-(2,2,1)-5-heptene-2-endocarboxamide. The tertiary amine distilled at 107–109° C. at 21 mm. pressure.

Exo-2-(1-pyrrolidylmethyl)-bicyclo-(2,2,1)-5-heptene methiodide was prepared from the tertiary amine by the procedure described in Example I for the preparation of the methiodide of endo-2-(1-pyrridylmethyl)-bicyclo-(2,2,1)-5-heptene. The methiodide salt had a melting point of 195–196° C.

Calculated for $C_{13}H_{22}NI$: Percent
- Carbon _____ 48.91
- Hydrogen _____ 6.95
- Nitrogen _____ 4.39

Found:
- Carbon _____ 49.19
- Hydrogen _____ 7.06
- Nitrogen _____ 4.07

EXAMPLE III

*Endo-2-(1-piperidylmethyl)-bicyclo-(2,2,1)-5-heptene*

A mixture of 93.6 parts of 2-endobromomethylbicyclo-(2,2,1)-5-heptene and 91 parts of piperidine was heated in a sealed glass tube at 170° for 30 hours. The reaction mixture was diluted with 100 parts of ether and acidified with dilute aqueous hydrochloric acid. The aqueous phase was separated, washed with ether and made alkaline with excess 50 percent aqueous sodium hydroxide solution. The precipitated oil was drawn off and the aqueous solution extracted with ether. The oil and ethereal extracts were combined and dried over anhydrous potassium carbonate. The product was recovered by distillation and had a boiling point of 63–66° C. at 0.3 mm. of pressure.

Endo-2-(1-piperidylmethyl)-bicyclo-(2,2,1)-5-heptene methiodide was prepared from the tertiary amine by the procedure described in Example I for the preparation of the methiodide salt of endo-2-(1-pyrrolidylmethyl) - bicyclo - (2,2,1) - 5 - heptene and had a melting point of 238–241 5 C.

Calculated for $C_{14}H_{24}NI$:                    Percent
  Carbon _____ 50.45
  Hydrogen _____ 7.26
Found:
  Carbon _____ 50.47
  Hydrogen _____ 7.25

Endo - 2 - (1 - piperidylmethyl) - bicyclo - (2,2,1)-5-heptene hydrochloride was prepared from the tertiary amine by the procedure described in Example I for the preparation of the hydrochloride salt of endo-2-(1-pyrrolidylmethyl)-bicyclo-(2,2,1)-5-heptene and had a melting point of 252–253° C. with decomposition after recrystallization from isopropanol.

Calculated for $C_{13}H_{22}NCl$:                  Percent
  Carbon _____ 68.55
  Hydrogen _____ 9.74
  Chloride _____ 15.57
Found:
  Carbon _____ 68.44
  Hydrogen _____ 9.72
  Chloride _____ 15.50

Intravenous injection of the quaternary methiodide salts endo-2-(1-pyrrolidylmethyl)-bicyclo-(2,2,1)-5-heptene, exo-2-(1-pyrrolidylmethyl)-bicyclo-(2,2,1)-5-heptene, and 3-(1-pyrrolidylmethyl)-nortricyclene caused an elevation of blood pressure in anesthetized and spinal cats. Intravenous injection of the quaternary benzyl chloride salt of endo-2-(1-pyrrolidylmethyl)-bicyclo-(2,2,1)-5-heptene produced a depressor effect in anesthetized cats. Five-tenths milligram of each compound significantly reduced the coronary flow on the cat's heart, perfused according to the method of 0. Langendorff, Arch. ges. Physiol., volume 61, page 291 (1895), whereas the cardiac contraction and rate remained practically unchanged. In anesthetized cats, intracarotid injection of the same compounds elicited contraction of the nictitating membrane, dilatation of the pupil; salivation also being elicited by all of the compounds except the quaternary benzyl chloride salt of endo-2-(1-pyrrolidylmethyl)-bicyclo-(2,2,1)-5-heptene. By the use of ganglion-blocking agents and/or removal of the superior cervical ganglion in atropinized, anesthetized cats, it was ascertained that the contraction of the nictitating membrane and dilatation of the pupil were due to stimulation of the superior cervical ganglion. At higher doses in anesthetized cats, contraction of the nictitating membrane was more strongly inhibited following electrical stimulation of the preganglionic fibers than following stimulation of the postganglionic fibers. This suggests a depression of the superior cervical ganglion and also a depression peripheral to the ganglion. All of these observations suggest that these compounds share some of the actions of nicotine.

Endo - 2 - (1 - pyrrolidylmethyl) - bicyclo - (2,2,1)-5-heptene methiodide, exo-2-(1-pyrrolidylmethyl)-bicyclo-(2,2,1)-5-heptene methiodide, 3-(1-pyrrolidylmethyl)-nortricyclene methiodide, and the quaternary benzyl chloride salt of endo-2-(1-pyrrolidylmethyl)-bicyclo-(2,2,1)-5-heptene were each injected through polyethylene tubing into the femoral vein of a separate group of four cats which had been anesthetized by intraperitoneal injection of 0.7 cc. per kilo of body weight of a solution containing 2.5 grams of diallylbarbituric acid, ten grams of ethyl carbamate, ten grams of monoethylurea and five cc. of water. Each intravenous injection of a compound to be tested was followed by injection of five-tenths cc. of physiological saline solution through the polyethylene tubing. The effect of the injections on the blood pressure of the animals was recorded by a mercury manometer which was connected to the left carotid artery of the injected animal.

Injection of one milligram per kilogram of body weight of the quaternary methiodide salts of endo-2-(1-pyrrolidylmethyl)-bicyclo-(2,2,1)-5-heptene, and 3-(1-pyrrolidylmethyl)-nortricyclene resulted in an average percent increase in arterial blood pressure of 56.3 and 56.8, respectively.

Injection of five milligrams per kilogram of body weight of the quaternary methiodide salt of exo-2-(1-pyrrolidylmethyl)-bicyclo-(2,2,1) - 5 - heptene and the quaternary benzyl chloride salt of endo-2-(1-pyrrolidylmethyl)-bicyclo-(2,2,1)-5-heptene resulted in an average percent decrease in arterial blood pressure of 61.6 and 33.0, respectively.

The $LD_{50}$ values of endo - 2 - 1-(pyrrolidylmethyl)-bicyclo - (2,2,1) - 5 - heptene methiodide and exo-2-(1-pyrrolidylmethyl)-bicyclo-(2,2,1)-5-heptene methiodide were determined by intraperitoneal injection of the substances into mice. The $LD_{50}$ values of 3-(1-pyrrolidylmethyl)-nortricyclene methiodide and the quaternary benzyl chloride salt of endo-2-(1-pyrrolidylmethyl)-bicyclo-(2,2,1)-5-heptene were determined by intraperitoneal injection of the substances into rates. The $LD_{50}$ values were calculated in all instances according to the method of Litchfield and Wilcoxon, American Journal of Pharmacology and Experimental Therapeutics, volume 96, page 99 (1949). The median dose of the above substances required to kill fifty percent of the mice to which they were administered was 79, 54, 100, and 200 milligrams per kilo of body weight, respectively.

While the invention has been illustrated by certain individual specific embodiments, it is understood that variations, substitutions and modifications may be made to the extent of the appended claims.

What is claimed is:

1. A compound selected from the group consisting of compounds having the planar structural formulas:

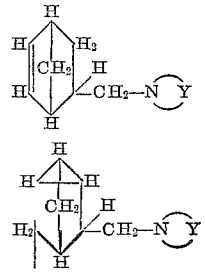

in which Y is a bivalent alkylene radical having at least four and not more than five carbon atoms, non-toxic acid addition salts and quaternary ammonium salts thereof.

2. Endo - 2 - (1 - pyrrolidylmethyl) - bicyclo - (2,2,1) - 5-heptene.

3. Exo - 2 - (1 - pyrrolidylmethyl) - bicyclo - (2,2,1) - 5-heptene.

4. Endo - 2 - (1 - piperidylmethyl) - bicyclo - (2,2,1) - 5-heptene.

5. 3-(1-pyrrolidylmethyl)-nortricyclene.

6. Endo - 2 - (1 - piperidylmethyl) - bicyclo - (2,2,1) - 5-heptene methiodide.

No references cited.

UNITED STATES PATENT OFFICE
Certificate of Correction

Patent No. 2,846,436                                              August 5, 1958

Werner R. Boehme et al.

It is hereby certified that error appears in the printed specification of the above numbered patent requiring correction and that the said Letters Patent should read as corrected below.

Column 2, line 13, after "lithium" insert —aluminum—; column 5, line 3, for "238–2415 C." read —238–241° C.—; column 6, line 27, for "rates" read —rats—; lines 48–53, the structural formula should appear as shown below instead of as in the patent—

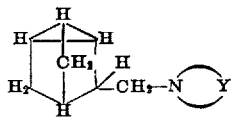

Signed and sealed this 14th day of October 1958.

[SEAL]

Attest:
KARL H. AXLINE,
*Attesting Officer.*

ROBERT C. WATSON,
*Commissioner of Patents.*